Patented May 30, 1944

2,349,986

UNITED STATES PATENT OFFICE 2,349,986

AQUEOUS SOLUTION OF LACTOFLAVIN

Ernst Preiswerk, Munchenstein, near Basel, Switzerland, assignor to Hoffmann-La Roche Inc., Nutley, N. J., a corporation of New Jersey No Drawing. Application April 9, 1942, Serial No. 438,325. In Switzerland April 3, 1941

6 Claims. (Cl. 167—81)

In order to prepare aqueous solutions of lactoflavin (vitamin $B_2$) in appropriate concentrations for use in therapy, the employment of materials for increasing the solubility is necessary. But very few physiologically indifferent materials have hitherto become known which, as such or in aqueous solution, are capable of increasing the solubility of lactoflavin. However, with these compounds, as evidenced for instance by German patent specification No. 688,047, only a moderate increase in the solubility of lactoflavin can be obtained, viz.: from 0.013% to 0.4% at the highest, and comparatively large quantities of said solubilising agents are necessary.

It has now been found that the aqueous solutions of salts of 2,4-dihydroxy-benzoic acid, or of its monoalkyl-ether, with alkalis, such as light metals and ammonia, or strong organic bases, possess a strongly marked dissolving power for lactoflavin; there may be used water-soluble organic bases of higher pH than 9, which are physiologically indifferent, e. g., lower primary, secondary or tertiary alkylamines, primary aralkylamines, hydroaromatic amines, such as cyclohexylamine, and saturated heterocyclic compounds, such as morpholine and piperidine. Thus, a 6% solution of the sodium salt of 2,4-dihydroxybenzoic acid is capable of dissolving about 0.5% of lactoflavin, a 25% solution of lithium salt more than 3% of lactoflavin. With a 10% solution of the sodium salt of 2-hydroxy-4-ethoxy-benzoic acid up to 1.8% of lactoflavin can be kept in solution at 20° C., and more than 3% of lactoflavin with a 25% solution of the sodium salt of 2-hydroxy-4-methoxy-benzoic acid. By means of the salts of organic bases aqueous solutions having a lactoflavin content of up to 4% can be prepared.

The water-soluble salts of dihydroxy-benzoic acid and of its monoalkyl-ether with alkalis or strong organic bases are not toxic and are well tolerated. Thus, for instance, a rabbit shows no symptoms whatever of any toxic reaction on intravenous administration of 1.5 grams per kilogram. The pH of the water-soluble salts of dihydroxy-benzoic acid and of its monoalkyl-ether with alkalis or strong organic bases lies between 5 and 6, within which range lactoflavin is stable.

Solutions of the water-soluble salts of 2,4-dihydroxy-benzoic acid and of its monoalkyl-ether with alkalis or strong organic bases, as such or mixed with each other or with other materials known to increase solubility or known as buffer substances, are therefore to be used as solubilising agents.

Example 1

5.5 parts by weight of the sodium salt of 2,4-dihydroxy-benzoic acid are dissolved in 100 parts by weight of water and this solution shaken with 0.5 part by weight of lactoflavin at room temperature until it is completely dissolved.

Example 2

24.07 parts by weight of 2,4-dihydroxy-benzoic acid are neutralised with 1 part by weight of lithium-carbonate, and water added to give a volume of 100 parts. 3 parts by weight of lactoflavin are added to the filtered solution, the pH of which should be 5.2. The lactoflavin dissolves on shaking or stirring without external heating in a few minutes, rendering a completely clear solution.

Example 3

10 parts by weight of the sodium salt of 2-hydroxy-4-ethoxy-benzoic acid are dissolved in 100 parts by weight of water and this solution shaken with 1.8 parts by weight of lactoflavin at room temperature until it has dissolved.

Example 4

25 parts by weight of the sodium salt of 2-hydroxy-4-methoxy-benzoic acid and 3 parts by weight of lactoflavin are shaken with 72 parts by weight of water until a clear solution is obtained.

Example 5

15 parts by weight of the methylamine salt of 2-hydroxy-4-methoxy-benzoic acid (colourless crystals of melting point 121–122° C.) and 1 part by weight of lactoflavin are shaken with 90 parts by weight of water, whereby a clear solution is obtained in a few minutes which contains 1% of lactoflavin.

Example 6

10 parts by weight of 2,4-dihydroxy-benzoic acid are suspended in 40 parts by weight of water and neutralised by the addition of 8.7 parts by weight of a 30% aqueous solution of dimethylamine or of the equivalent quantity of dimethylamine of any other concentration, and brought to 63 parts by volume, whereby a 20% solution of the dimethylamine salt of 2,4-dihydroxy-benzoic acid results.

In this solution up to 3.4% of lactoflavin can easily be dissolved.

Example 7

10 parts by weight of 2,4-dihydroxy-benzoic acid are neutralised with 20.1 parts by weight of a 10% aqueous solution of methylamine, 2.4 parts by weight of lactoflavin added, which dissolves completely in a few minutes. The whole is then diluted with water to 60 parts by volume. A 20% solution of the methylamine salt of 2,4-dihydroxy-benzoic acid is thereby obtained, which contains 4% of lactoflavin.

*Example 8*

20 parts by weight of the morpholine salt of 2,4-dihydroxy-benzoic acid (melting point 161–161° C.), 2.5 parts by weight of lactoflavin and 75 parts by weight of water are shaken together until a homogeneous solution is obtained. The clear solution is brought to 100 parts by volume with water; it contains 20% of the morpholine salt of 2,4-dihydroxy-benzoic acid and 2.5% of lactoflavin.

*Example 9*

40 parts by weight of the diethylamino-ethanol salt of 2,4-dihydroxy-benzoic acid (melting point 90–91° C.) are dissolved in water to a volume of 100 parts and 2 parts by weight of lactoflavin dissolved therein by shaking. This solution contains 40% of the diethylamino-ethanol salt of 2,4-dihydroxy-benzoic acid and 2% of lactoflavin.

*Example 10*

15.4 parts by weight of 2-hydroxy-4-methoxybenzoic acid are dissolved in 48 parts by weight of a 20% aqueous solution of diethanol-amine, 1 part by weight of lactoflavin is then added and the whole diluted to 100 parts by volume with water.

The resulting solution which is almost neutral contains 1% of lactoflavin.

I claim:

1. An aqueous solution of more than .013% of lactoflavin containing a water-soluble salt of a compound selected from the group consisting of 2,4-dihydroxy-benzoic acid and its mono-alkyl ethers.

2. Aqueous solutions of more than .013% of lactoflavin containing a salt of dihydroxy-benzoic acid with a physiologically indifferent water-soluble organic base.

3. Aqueous solutions of more than .013% lactoflavin containing dihydroxy-benzoic acid methylamine salt.

4. Aqueous solutions of more than .013% of lactoflavin containing a salt of 2-hydroxy-4-alkoxy-benzoic acid with an alkali metal.

5. Aqueous solutions of more than .013% of lactoflavin containing 2-hydroxy-4-methoxy-benzoic acid sodium salt.

6. Aqueous solutions of more than .013% of lactoflavin containing 2-hydroxy-4-ethoxy-benzoic acid sodium salt.

ERNST PREISWERK.